() United States Patent  
Lee et al.

(10) Patent No.: US 9,219,269 B2  
(45) Date of Patent: Dec. 22, 2015

(54) APPARATUS FOR MIXING ELECTROLYTE IN BATTERY (71) Applicant: Global Battery Co., Ltd, Seoul (KR)

(72) Inventors: Kyu Hyeong Lee, Gwangju (KR); Seung Bok Park, Gwangju (KR); Hyun Ryung Kim, Gwangju (KR)

(73) Assignee: GLOBAL BATTERY CO., LTD., Seoul (KR)

( * ) Notice: Subject to any disclaimer, the term of this patent is extended or adjusted under 35 U.S.C. 154(b) by 191 days.

(21) Appl. No.: 13/717,932

(22) Filed: Dec. 18, 2012

(65) Prior Publication Data  
US 2013/0288090 A1 Oct. 31, 2013

(30) Foreign Application Priority Data  
Apr. 30, 2012 (KR) .................. 10-2012-0045098

(51) Int. Cl.  
*H01M 2/38* (2006.01)  
*H01M 10/42* (2006.01)

(52) U.S. Cl.  
CPC ............ *H01M 2/38* (2013.01); *H01M 10/4214* (2013.01); *H01M 2220/20* (2013.01)

(58) Field of Classification Search  
CPC .................... H01M 10/4214; H01M 2220/20; H01M 2/38  
USPC ......................................... 429/81  
See application file for complete search history.

(56) References Cited

FOREIGN PATENT DOCUMENTS

WO WO 2011029035 A2 * 3/2011

* cited by examiner

*Primary Examiner* — Jonathan Jelsma  
*Assistant Examiner* — Rashid Alam  
(74) *Attorney, Agent, or Firm* — The PL Law Group, PLLC (57) ABSTRACT An electrolyte mixing apparatus mixes lower-specific-gravity electrolyte with higher-specific-gravity electrolyte using inertial force generated when a vehicle starts to move and stops. The electrolyte mixing apparatus thus prevents the electrolyte in the battery from being formed in lower- and higher-specific-gravity layers according to specific gravity.

14 Claims, 9 Drawing Sheets

APPARATUS FOR MIXING ELECTROLYTE IN BATTERY

CROSS REFERENCE TO RELATED APPLICATIONS AND CLAIM OF PRIORITY

This patent application claims priority to Korean Patent Application number 10-2012-0045098, filed Apr. 30, 2012, entire contents of which are incorporated herein by reference.

BACKGROUND

1. Field of the Invention

The present invention relates generally to apparatuses for mixing electrolyte in batteries.

2. Description of the Related Art

Batteries are devices which have a chemical action and generate electromotive force. Particularly, batteries which are rechargeable are called secondary batteries.

As is well-known to those skilled in this art, in the batteries, lead peroxide ($PbO_2$) is used as a positive pole, foamed lead (Pb) is used as a negative pole, and dilute sulfuric acid ($H_2SO_2$) is used as electrolyte.

Such a battery makes flow of current using a potential difference between the positive pole and the negative pole that are respectively formed of lead peroxide and lead, thus generating power for operating a load. Here, a casing of the battery is filled with the electrolyte in such a way that the surface of the electrolyte is higher than the upper ends of pole plates fixed in the casing of the battery.

With the passage of time after the electrolyte has been supplied into the casing, as the battery is rechargeably used, the electrolyte is layered according to specific gravity so that lower-specific-gravity electrolyte is disposed in an upper layer while higher-specific-gravity electrolyte goes down into a lower layer.

The layering of electrolyte means separation of electrolyte into multiple layers according to specific gravity. This is a general phenomenon which is caused by a difference in specific gravity under conditions of no convection.

However, the pole plates restrict the flow of electrolyte so that upper and lower portions of electrolyte cannot be smoothly mixed with each other, thus causing the electrolyte to be layered. That is, in the conventional battery, the layering of electrolyte makes the specific gravity of electrolyte around the lower portion of the pole plate assembly high. Because the concentration of higher-specific-gravity sulfuric acid solution is comparatively high, corrosion of the lower portions of the pole plates accelerates.

Furthermore, in the conventional battery, due to higher-specific-gravity electrolyte that is disposed in the lower portion of the battery in which the pole plate assembly is provided, the terminal voltage of the battery may be indicated higher than an actual degree of charge. Such overvoltage may cause insufficient charge in a typical charging method of vehicles or other machines in which charge voltage is adjusted to a predetermined voltage. Moreover, continuous use of the battery that is in the insufficient charge state also accelerates sulfation of the pole plates, thus reducing the lifetime of the battery.

SUMMARY

An aspect of the present invention is to provide an apparatus for mixing electrolyte in a battery which can use inertial force created by movement of a vehicle and mix electrolyte that is separated into lower-specific-gravity electrolyte and higher-specific-gravity electrolyte, thus extending the lifetime of the battery.

According to an aspect of the present invention, the an apparatus for mixing lower-specific-gravity electrolyte with higher-specific-gravity electrolyte disposed at a lower position in a battery, the apparatus includes: a support including a plate protruding upward, the support being installed such that a space is defined between the support and an inner surface of a sidewall of a casing of the battery; a bottom part extending in one direction from an upper end of the support to form a bottom surface; a first side part protruding upward from a first side edge of an upper surface of the bottom part and extending along the first side edge of the bottom part; and a second side part protruding upward from a second side edge of the upper surface of the bottom part and extending to a front edge of the bottom part, wherein an end of the first side part and an end of the second side part are spaced apart from each other by a predetermined distance to define an inlet through which electrolyte is drawn inside the bottom part, and the support is installed to be spaced apart from the inner surface of the sidewall of the casing of the battery so that a vertical passage is defined by the support and the inner surface of the sidewall of the casing, wherein the electrolyte is moved along the vertical passage upward or downward depending on a direction of kinetic energy applied to the electrolyte.

The apparatus may further include: a first slant part including a plate extending slantedly from the first side part toward an inside of the bottom part; and a second slant part including a plate extending slantedly from the second side part toward the inside of the bottom part, wherein the first slant part and the second slant part may extend in directions opposite to each other with a space defined therebetween.

The second slant part may include: a first slant plate section including a plate extending perpendicularly from the end of the second side part toward the inside of the bottom part; and a second slant plate section extending slantedly from the first slant plate section toward the first side part.

Furthermore, an end of the second slant plate section may be spaced apart from the first side part so that a first inlet, through which the electrolyte flows, is defined therebetween.

The first slant part may include: a first slant plate section including a plate extending slantedly from the first side part toward the inside of the bottom part; a second slant plate section extending from an end of the first slant plate section in a direction parallel to the first side part; and a third slant plate section extending slantedly from the second slant plate section toward the second side edge of the bottom part.

In addition, an end of the third slant plate section may be spaced apart from the second side part so that a second inlet, through which the electrolyte flows, is defined therebetween.

The apparatus may be fixed in the casing by an outer surface of a pole plate assembly.

The first slant part and the second slant part may extend toward the inside of the bottom part with a space defined therebetween so that a space on the upper surface of the bottom part is partitioned into at least two spaces, wherein the second slant part may partition the space on the upper surface of the bottom part into a first space formed at a first side of the second slant part so that the electrolyte is drawn into the first space, and a second space formed at a second side of the second slant part between the first slant part and the second slant part so that the electrolyte is contained in the second space, and the first slant part may define a third space along with the second side part at a side opposite to the second space, the third space communicating with the vertical passage.

In an apparatus for mixing electrolyte in a battery according to an embodiment of the present invention, a passage is formed such that lower-specific-gravity electrolyte is drawn into the electrolyte mixing apparatus by inertia, and the lower-specific-gravity electrolyte that has been in the apparatus is moved downward by opposing kinetic energy. Therefore, lower-specific-gravity electrolyte and higher-specific-gravity electrolyte can be effectively mixed with each other so that a pole plate assembly can be prevented from corroding, and the layering of electrolyte which causes overvoltage can be avoided, thus extending the lifetime of the battery.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, an apparatus for mixing electrolyte in a battery according to exemplary embodiments of the present invention will be described in detail with reference to the attached drawings.

Figure 1:
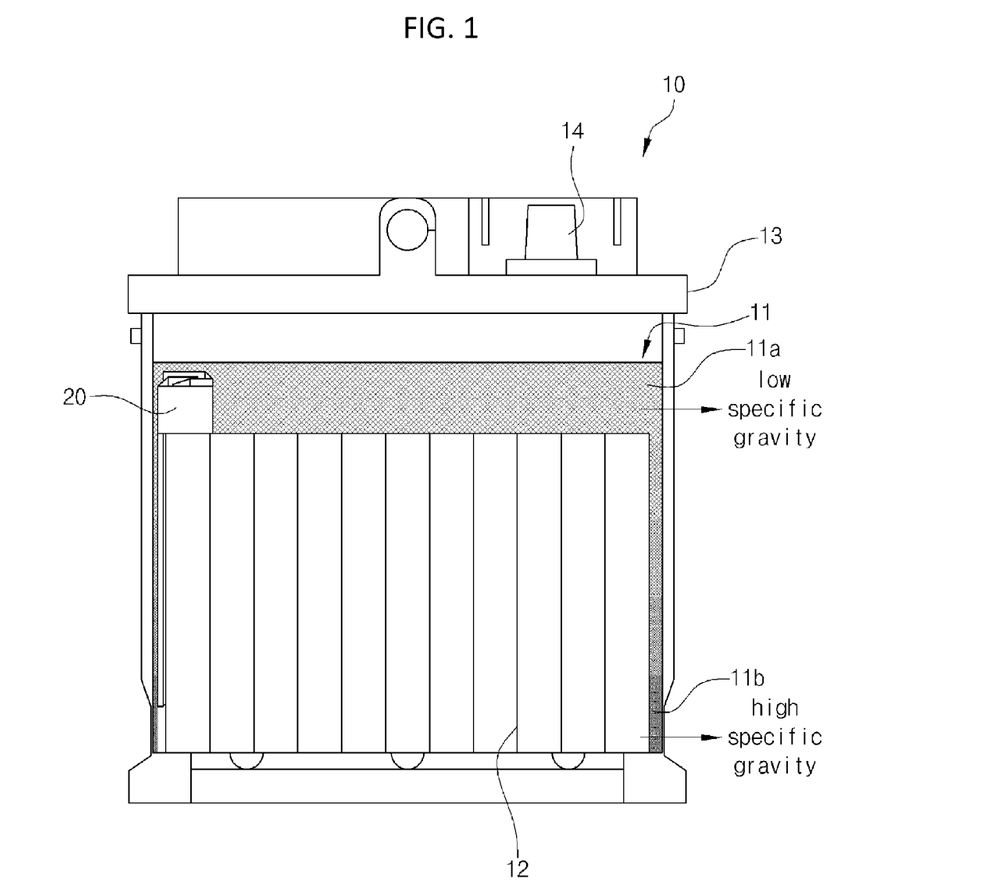
FIG. 1 is a sectional view illustrating a battery provided with an apparatus for mixing electrolyte according to an embodiment of the present invention.

FIG. 1 is a sectional view illustrating a battery provided with the electrolyte mixing apparatus according to an embodiment of the present invention.

Referring to FIG. 1, the electrolyte mixing apparatus according to an embodiment of the present invention is installed upright on a sidewall of a casing 15 of the battery. The battery includes a cover 13 which seals an upper end of the casing 15, terminal posts 14 which protrude from an upper surface of the cover 13 so that power is input/output through the terminal posts 14, and the casing 15 which contains therein the electrolyte mixing apparatus 20, a pole plate assembly 12 and the electrolyte 11.

The pole plate assembly 12 includes pole plates which are arranged in a central portion of the casing 15 and immersed in the electrolyte 11. The pole plate assembly 12 includes a positive plate (not shown), a negative plate (not shown), and a separator which separates the positive plate and the negative plate from each other. The separator that separates the positive plate from the negative plate forms an outer surface of the pole plate assembly 12. Furthermore, the separator of the pole plate assembly 12 pressurizes the electrolyte mixing apparatus and fixes it to the casing 15 of the battery. The negative plate, the positive plate, and the separator have well-known constructions, therefore they are not shown in detail in the drawings.

The electrolyte 11 is contained in the casing 15. The amount of electrolyte 11 contained in the casing 15 is sufficient to immerse the pole plate assembly 12 therein. The electrolyte 11 separates as a first electrolyte 11a disposed at an upper position and a second electrolyte 11b disposed at a lower position according to a specific gravity. Hereinafter, the first electrolyte is referred to as a lower-specific-gravity electrolyte and the second electrolyte is referred to as a higher-specific-gravity electrolyte.

The casing 15 has front, rear, left, and right sidewalls and the bottom, thus forming an internal space in which the pole plate assembly 12 and the electrolyte 11 are contained. The upper end of the casing 15 is covered with and sealed by the cover 13.

Given the direction in which the electrolyte 11 is moved in the casing 15 by inertia, the electrolyte mixing apparatus 20 may be installed on each of the front and rear sidewalls of the casing 15 or on either the front or rear sidewall. Although the electrolyte mixing apparatus 20 will be illustrated as being installed on one sidewall of the casing 15 as one example in the drawings and in the follow description, electrolyte mixing apparatuses may be provided on respective opposite sidewalls of the casing 15, as stated above. The electrolyte mixing apparatus 20 is pressurized by the outer surface of the pole plate assembly 12 and fixed to the inner surface of the casing 15.

The construction of the electrolyte mixing apparatus 20 will be explained with reference to FIGS. 2 through 5.

Figure 2:
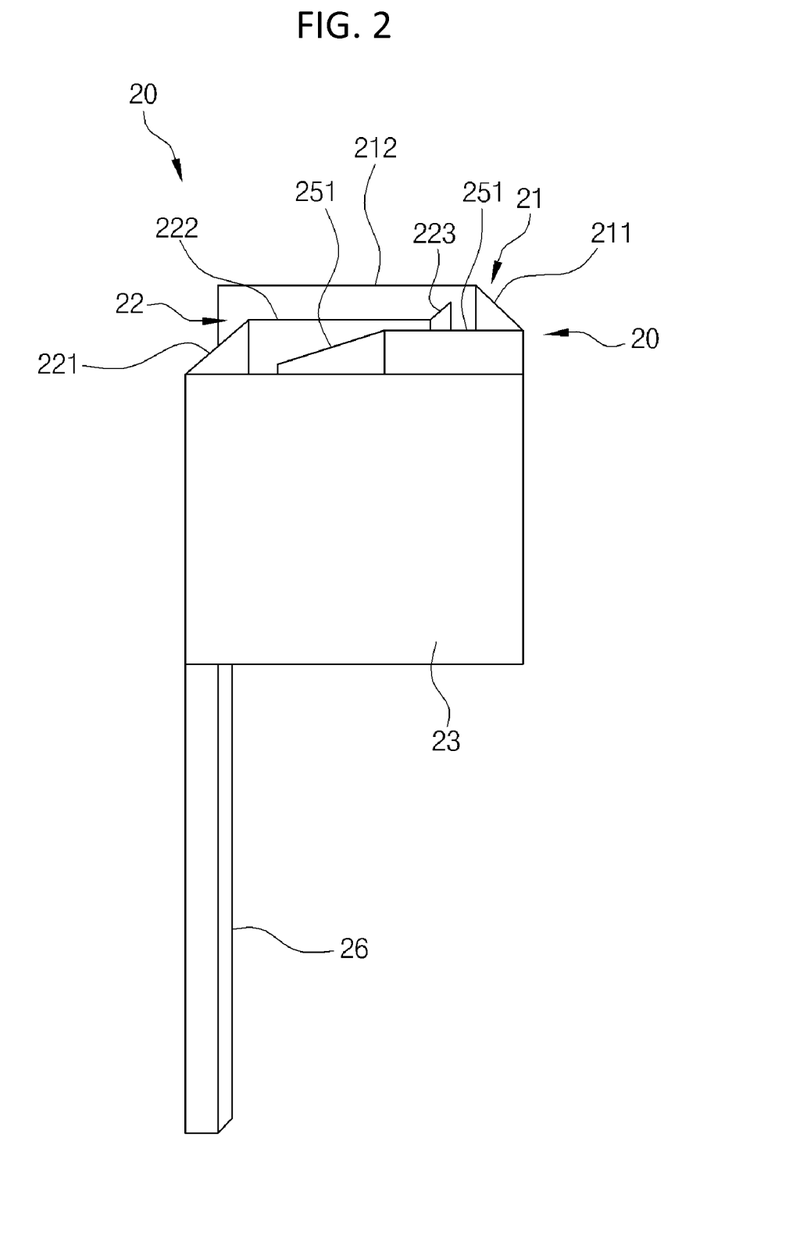
FIG. 2 is a side view illustrating the apparatus for mixing electrolyte in a battery according to an embodiment of the present invention.
Figure 3:
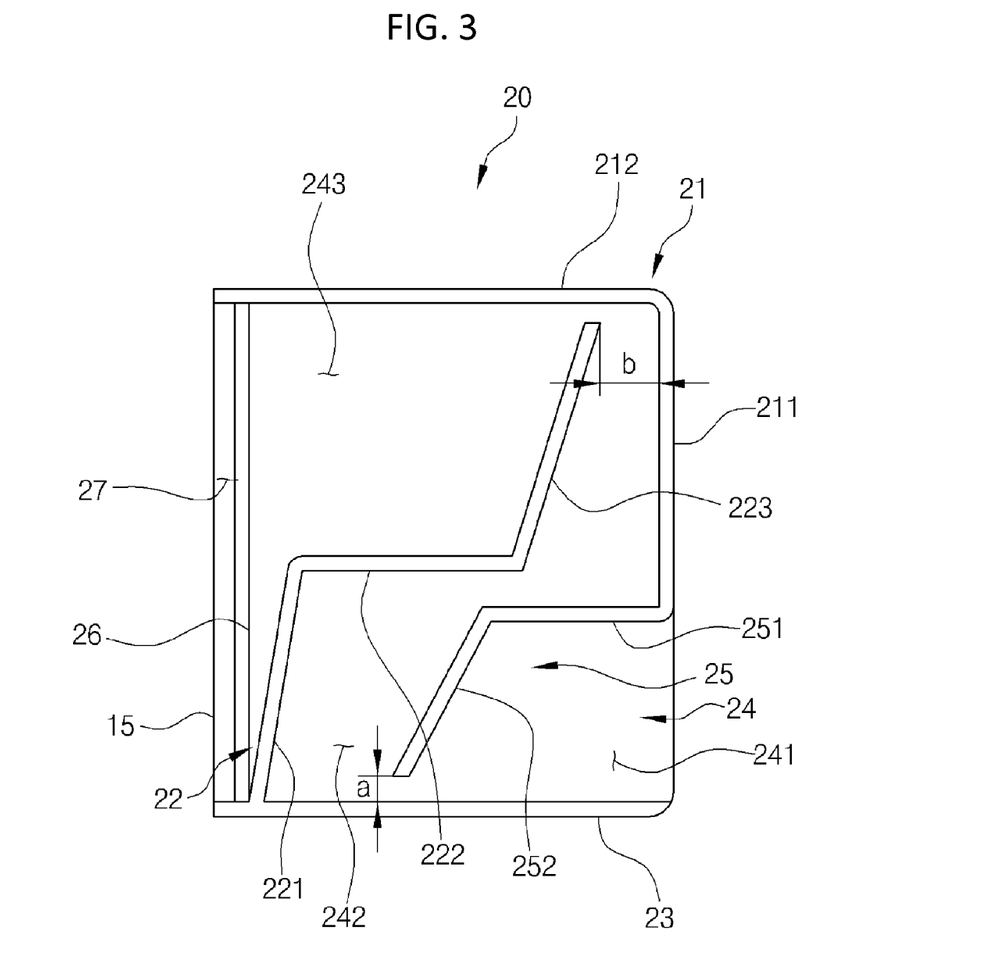
FIG. 3 is a plan view of the electrolyte mixing apparatus according to an embodiment of the present invention.
Figure 4:
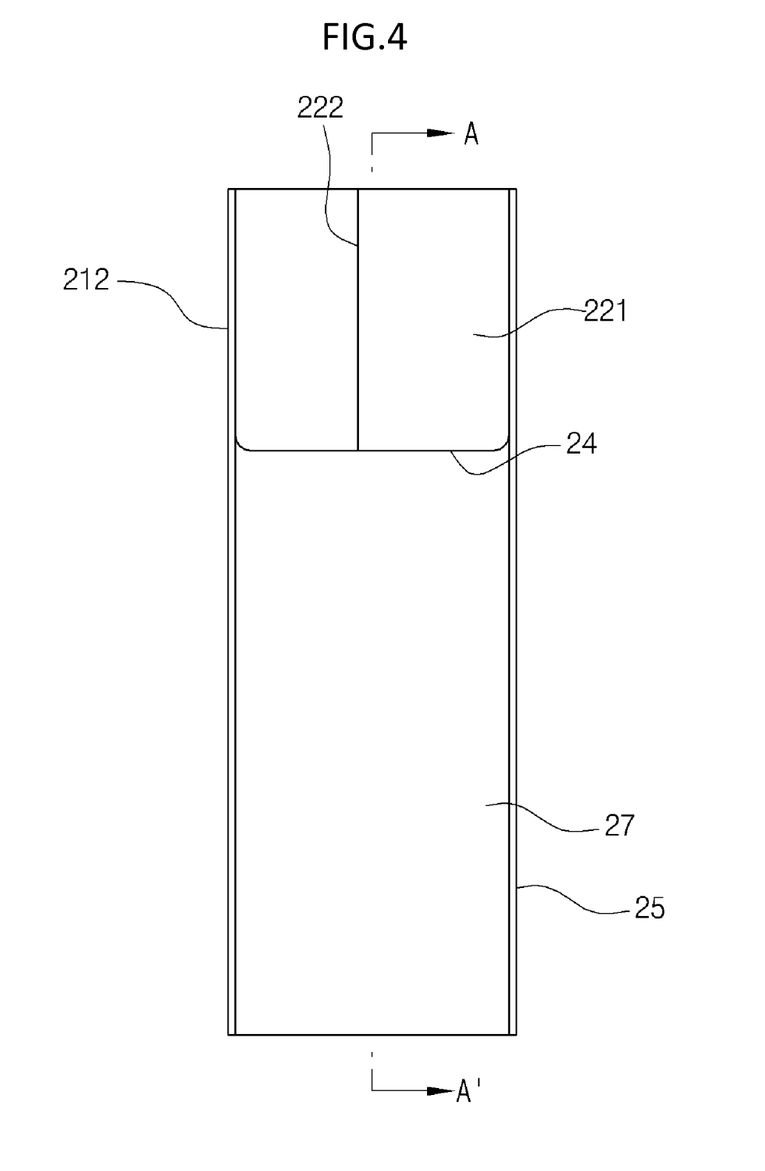
FIG. 4 is a rear view of the electrolyte mixing apparatus according to an embodiment of the present invention.
Figure 5:
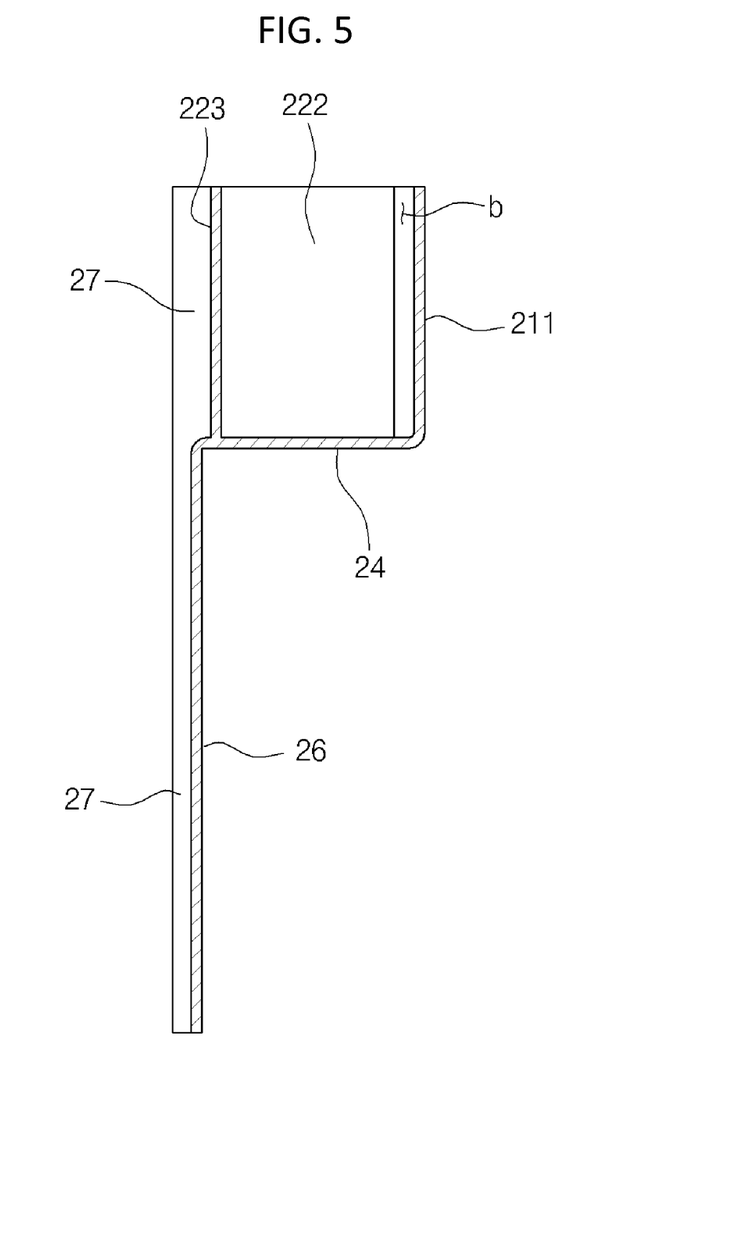
FIG. 5 is a sectional view taken along line A-A' of FIG. 4.

FIG. 2 is a side view illustrating the electrolyte mixing apparatus according to an embodiment of the present invention, FIG. 3 is a plan view of the electrolyte mixing apparatus according to an embodiment of the present invention, FIG. 4 is a rear view of the electrolyte mixing apparatus according to an embodiment of the present invention, and FIG. 5 is a sectional view taken along line A-A' of FIG. 4.

Referring to FIGS. 2 through 5, the electrolyte mixing apparatus 20 includes: a support 26 which is provided upright; a first side part 23 which is disposed above the support 26 and forms a first side surface of the apparatus; a second side part 21 which forms a second side surface that is opposite to the first side part 23; a bottom part 24 which is provided on the support 26 and supports the first side part 23 and the second side part 21 thereon; a first slant part 22 which extends inward from an inner surface of the first side part 23 and forms a slant plate; a second slant part 25 which slantedly extends inward from an inner surface of the second side part 21; and a vertical passage 27 which is a depression that extends to a lower end of the support 26 and forms a space between the inner surface of the casing 15 and the electrolyte mixing apparatus 20.

The support 26 is formed of an upright plate and is disposed such that it is spaced apart from the inner surface of the casing 15. According to an embodiment of the present invention, opposite edges of the support 26 are bent toward the inner surface of the casing 15 so that the vertical passage 27 is defined between the support 26 and the inner surface of the casing 15. Furthermore, the surface of the support 26 that is opposite to the vertical passage 27 is brought into close contact with the outer surface of the pole plate assembly so that the electrolyte mixing apparatus 20 is fixed to the casing 15.

The vertical passage 27 may be formed by a space defined between the support 26 and the inner surface of the casing 15 or by a depression which is formed in the surface of the support 26. The vertical passage 27 enables the lower-specific-gravity electrolyte 11a and the higher-specific-gravity electrolyte 11b that have been disposed at the upper and lower positions to be respectively moved to the lower and upper positions by kinetic energy.

The bottom part 24 forms a planar horizontal plate on the upper end of the support 26, and supports the first side part 23, the second side part 21, the first slant part 22, and the second slant part 25 which protrude upward from the upper surface of the bottom part 24 and extend in predetermined directions. The bottom part 24 is partitioned into a first space 241, a second space 242, and a third space 243. The first space 241 is defined by the first side part 23 and the second slant part 25. The second space 242 is defined by the first slant part 22 and the second slant part 25. The third space 243 is defined by the second side part 21 and the first slant part 22.

The first space 241 is a space into which electrolyte is drawn by inertia. The second space 242 stores electrolyte supplied from the first space 241 and transfers it to the third space 243. The third space 243 stores electrolyte 11 supplied from the second space 242 or drawn over the second side part 21 and then transfers it to the vertical passage 27.

The first side part 23 is formed of a plate which extends along the corresponding edge of the bottom part 24. A first end of the first side part 23 makes no contact with a corresponding end of the second side part 21; in other words, the first end of the first side part 23 is spaced apart from the corresponding end of the second side part 21, so that the first space 241 can be defined therebetween.

The first slant part 22 includes a first slant plate section 221 which slantedly extends from a second end of the first side part 23 toward the inside of the bottom part 24, a second slant plate section 222 which extends from the first slant plate section 221 in the direction parallel to the direction in which the first side part 23 extends, and a third slant plate section 223 which slantedly extends from the end of the second slant plate section 222 toward the second side part with space formed between it and the inner surface of the second side part 21.

That is, the first slant plate section 221, the second slant plate section 222, and the third slant plate section 223 of the first slant part 22 successively slantedly extend from the second end of the first side part 23, thus partitioning the internal space that is defined by the first side part 23 and the second side part 21 on the upper surface of the bottom part 24 into two portions. This characteristic will be described in more detail later herein along with the description of the second slant part 25.

The second side part 21 is a plate which protrudes upward from a second side edge of the bottom part 24 that is opposite to the first side part 23 and extends to the front edge of the bottom part 24. In more detail, the second side part 21 includes a first side plate 211 which protrudes upward from the front edge of the bottom part 24, and a second side plate 212 which protrudes upward from the second side edge of the bottom part 24 that is opposite to the first side part 23.

The first side plate 211 extends perpendicular to the second side plate 212. A first end of the first side plate 211 is spaced apart from the end of the first side part 23, while a second end of the first side plate 211 is connected to the second slant part 25.

The second side plate 212 is a plate which protrudes upward from the second side edge of the bottom part 24 which is connected to the upper end of the support 26 and extends to the second end of the first side plate 211.

The second slant part 25 is a plate which extends from the end of the second side part 21 in a slant direction. In detail, the second slant part 25 is disposed outside the first slant part 22, in other words, is provided at a position spaced apart from the first slant part 22. Further, the second slant part 25 slantedly extends from the end of the second side part 21 toward the first side part 23 and partitions the second space 242 into two portions.

The second slant part 25 includes a first slant plate section 251 which extends perpendicularly from the end of the second side part 21, and a second slant plate section 252 which extends slantedly from the first slant plate section 251 toward the first side part 23.

The end of the second slant plate section 252 of the second slant part 25 is spaced apart from the surface of the first side part 23, thus forming a first inlet a through which electrolyte 11 is drawn into the apparatus. The first slant plate section 251 of the second slant part 25 is spaced apart from the third slant plate section 223 of the first slant part 22, thus forming a passage through which electrolyte 11 is transferred to the third space 243.

Because the second slant plate section 252 is a plate which slantedly extends inward from the front portion of the bottom part 24, the first space 241 and the second space 242 of the bottom part 24 are partitioned from each other based on the second slant plate section 252.

As stated above, the first space 241 is a space which is open on a portion of the front end of the bottom part 24 so that electrolyte 11 is drawn into the first space 241 through the space between the end of the second side part 21 and the end of the first side part 23, and is blocked at the opposite side by the second slant plate section 252. Of course, the first inlet a is defined between the second slant plate section 252 and the first side part 23, as described above.

Furthermore, the first slant plate section 251 extends perpendicularly from the end of the second side part 21 such that an outer surface of the first slant plate section 251 is used to define the first space 241 while an inner surface thereof is spaced apart from the third slant plate section 223 to form the passage along which electrolyte 11 that has been drawn into the second space 242 flows toward the third space 243.

Hereinafter, the operation of the electrolyte mixing apparatus 20 according to an embodiment of the present invention having the above-mentioned construction will be explained in detail with reference to the attached drawings.

Figure 6A:
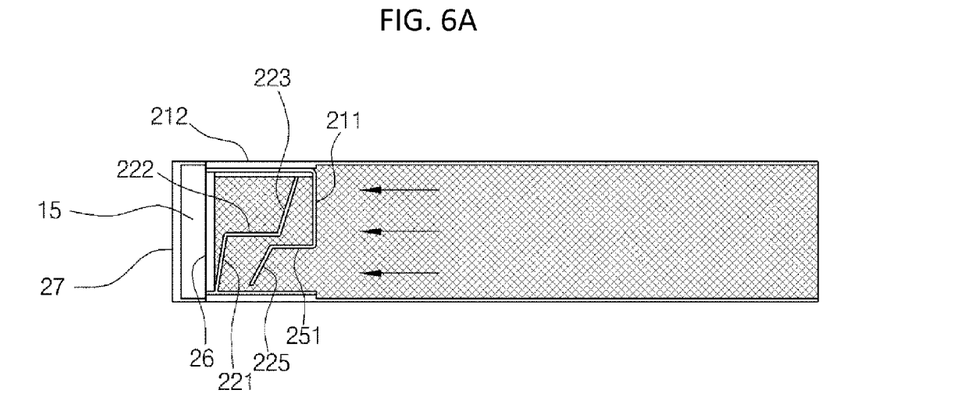
FIGS. 6A and 6B are respectively a plan view and a side sectional view showing directions in which the electrolyte moves in response to kinetic energy applied thereto in an embodiment of the electrolyte mixing apparatus according to an embodiment of the present invention.
Figure 6B:
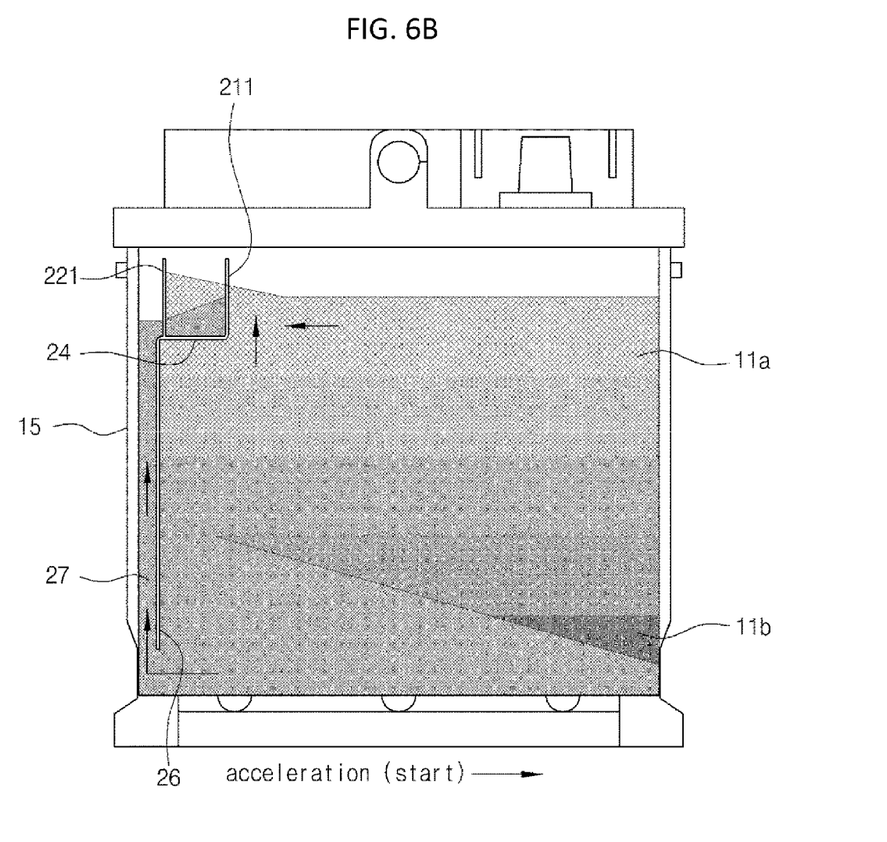

FIGS. 6A and 6B are respectively a plan view and a side sectional view showing the directions in which the electrolyte flows in response to kinetic energy applied thereto in an embodiment of the electrolyte mixing apparatus 20 according to an embodiment of the present invention.

Referring to FIGS. 6A and 6B, the electrolyte mixing apparatus 20 according to an embodiment of the present invention uses inertia in response to the movement of the vehicle to mix the lower-specific-gravity electrolyte 11a that is disposed at the upper portion with the higher-specific-gravity electrolyte 11b that is disposed at the lower portion.

For instance, the electrolyte mixing apparatus 20 is installed on the rear sidewall of the casing 15 that is adjacent to the rear end of the vehicle. Although the support 26 is brought into close contact with the surface of the sidewall of the casing 15, the vertical passage 27 is defined between the sidewall of the casing 15 and the support 26. Here, the upper end of the vertical passage 27 is open.

The electrolyte mixing apparatus 20 is fixed at a predetermined height in such a way that the upper end thereof is approximately level with the surface of the electrolyte 11.

Furthermore, the electrolyte mixing apparatus 20 comes into close contact with one sidewall of the pole plate assembly 12 which is fixed in the casing 15, and a passage is defined between the electrolyte mixing apparatus 20 and the inner surface of the sidewall of the casing 15. In other words, the electrolyte mixing apparatus 20 is fixed in the casing 15 by the pressurization of the pole plate assembly 12 without using a separate fixing element.

In the electrolyte mixing apparatus 20, lower-specific-gravity electrolyte is drawn into the second space 242 through the first inlet a. The electrolyte that has been drawn into the second space 242 flows into the third space 243 through the second inlet b. Here, electrolyte is still formed in layers depending on specific gravities in the vertical passage 27 between the apparatus and the sidewall of the casing 15.

When the vehicle moves in one direction after the engine of the vehicle has started, in other words, when the vehicle starts to move and accelerates in the direction of the arrow of FIG. 6B, the lower-specific-gravity electrolyte 11a that has been disposed at the upper position is moved by inertia kinetic energy toward the electrolyte mixing apparatus 20 in the direction opposite to the direction in which the vehicle moves.

As such, the lower-specific-gravity electrolyte 11a and the higher-specific-gravity electrolyte 11b are moved by kinetic energy applied thereto in the direction opposite to the direction in which the vehicle moves. Here, the lower-specific-gravity electrolyte 11a flows into the second space 242 and the third space 243 over the second side part 21 and the second slant part 25, and the higher-specific-gravity electrolyte 11b moves upward along the vertical passage 27 and flows into the third space 243.

Therefore, the lower-specific-gravity electrolyte 11a and the higher-specific-gravity electrolyte 11b are mixed with each other in the second space 242 and the third space 243. Here, the lower-specific-gravity electrolyte 11a is drawn into the second space 242 through the first inlet a, and is transferred from the second space 242 into the third space 243 through the second inlet b.

Thus, after the vehicle starts to move, higher-specific-gravity electrolyte 11b is drawn into the third space 243 by kinetic energy generated when the vehicle accelerates and is mixed with lower-specific-gravity electrolyte 11a so that a difference in specific gravity between them is reduced.

Thereafter, while the vehicle is running at a constant speed, electrolyte mixed in the third space 243 comes out of the third space 243 through the second inlet b and mixes with the lower-specific-gravity electrolyte 11a that has been in the second space 242. Electrolyte mixed in the second space 242 mixes, through the first inlet a, with that lower-specific-gravity electrolyte 11a that has been at the upper position.

Meanwhile, when the vehicle decelerates or stops, kinetic energy is applied to the electrolyte in the direction opposite to that of the kinetic energy applied thereto when the vehicle starts to move. The operation that pertains to this will be explained with reference to FIGS. 7A and 7B.

Figure 7A:
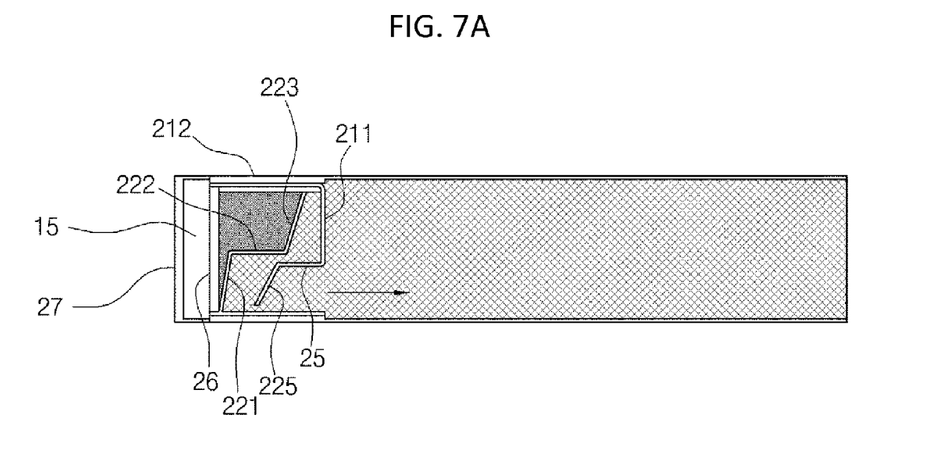
FIGS. 7A and 7B are respectively a plan view and a side sectional view illustrating a process of mixing the electrolyte in the embodiment of the electrolyte mixing apparatus according to an embodiment of the present invention.
Figure 7B:
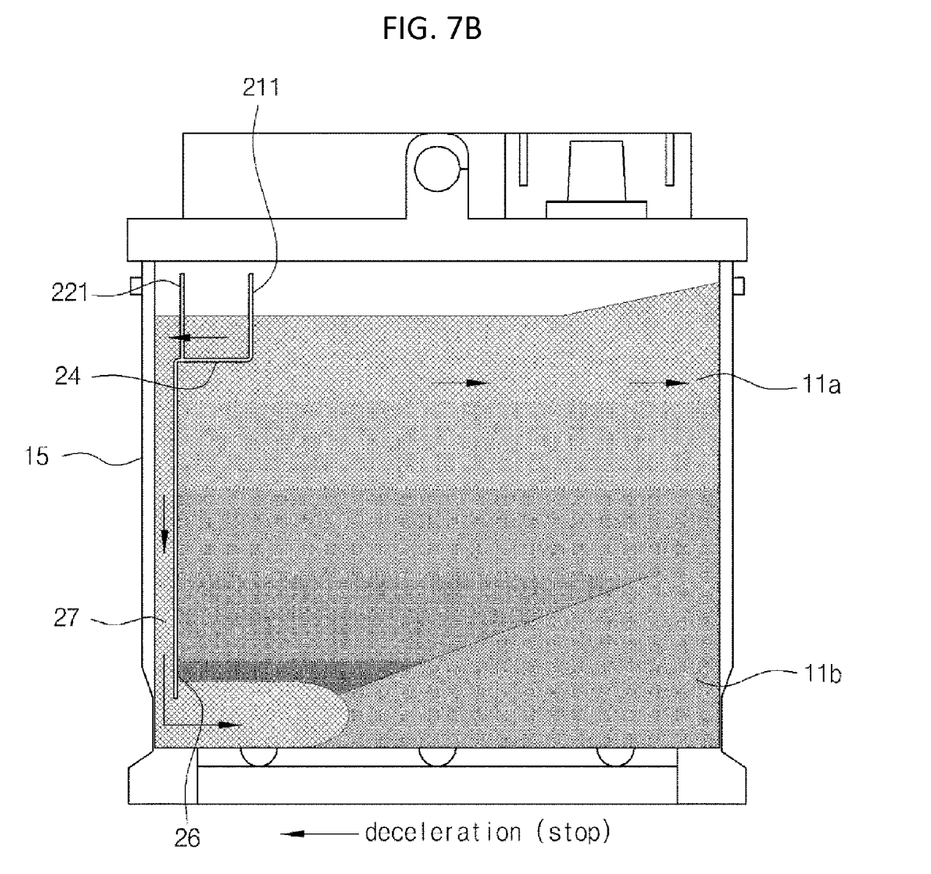

FIGS. 7A and 7B are respectively a plan view and a side sectional view illustrating a process of mixing the electrolyte in the embodiment of the electrolyte mixing apparatus 20 according to an embodiment of the present invention Referring to FIGS. 7A and 7B, when the vehicle which is running rapidly decelerates or stops, kinetic energy is applied to the battery in the direction opposite to the direction in which kinetic energy is applied to the battery when the vehicle starts to run or accelerates. Therefore, higher-specific-gravity electrolyte that has been in the vertical passage 27 is moved downward along the inner surface of the casing 15 by the kinetic energy that is applied to the battery, as shown in FIG. 7B.

Furthermore, mixed electrolyte that has been contained in the third space 243 moves downward along the vertical passage 27 as the higher-specific-gravity electrolyte 11b that has been in the vertical passage 27 flows downward. In the same manner, as the mixed electrolyte that has been contained in the third space 243 moves downward along the vertical passage 27, mixed electrolyte that has been contained in the second space 242 is drawn into the third space 243 through the second inlet b and then moved downward along the vertical passage 27.

That is, the electrolyte contained in the electrolyte mixing apparatus 20 flows in such a way that as higher-specific-gravity electrolyte that has been in the vertical passage 27 moves downward and comes out of the vertical passage 27, and mixed electrolyte that has been disposed at the upper position and contains lower-specific-gravity electrolyte and higher-specific-gravity electrolyte is drawn into the vertical passage 27 and moved downward. Therefore, as time passes, the amount of lower-specific-gravity electrolyte increases in electrolyte that is disposed at the lower position. As a result, the higher-specific-gravity electrolyte 11b that has been at the lower position and the lower-specific-gravity electrolyte 11b that has been at the upper position can be effectively mixed with each other.

As described above, in an embodiment of the present invention, the passage is formed between the upper position and the lower position such that the lower-specific-gravity electrolyte 11a of the upper position and the higher-specific-gravity electrolyte 11b of the lower position can be mixed with each other. Thus, the apparatus for mixing electrolyte in a battery mixes low-specific-gravity electrolyte with high-specific-gravity electrolyte using inertial force generated when a vehicle starts to move and stops, whereby preventing the electrolyte in the battery from being formed in low- and high-specific-gravity layers according to specific gravity Therefore, because lower-specific-gravity electrolyte and higher-specific-gravity electrolyte can be frequently mixed with each other, the present invention can avoid the conventional problem such as corrosion of the pole plate assembly 12 or incomplete charge attributable to overvoltage. As a result, the lifetime of the battery can be extended.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for mixing electrolyte, the apparatus comprising: a support comprising a plate protruding upward; a bottom part extending in one direction and in contact with an upper end of the support to form a bottom surface; a first side part protruding upward from a first side edge of and in contact with an upper surface of the bottom part and extending along the first side edge of the bottom part; a second side part protruding upward from and in contact with a second side edge of the upper surface of the bottom part and extending to a front edge of the bottom part; and a first slant part comprising a plate extending slantedly from and in contact with the first side part toward an inside of the bottom part; and a second slant part comprising a plate extending slantedly from and in contact with the second side part toward the inside of the bottom part; wherein the first slant part and the second slant part extend in directions opposite to each other; wherein the support, the first side part, the second side part, the first slant part, and the second slant part are formed to define a first space, a second space, a third space, a first inlet and a second inlet; the first space is defined between the first side part and the second slant part; the second space is defined between the first slant part and the second slant part and the first and the second side parts; and the third space is defined between the support, the second side part, and the first slant part; the first inlet is formed between the first side part and an end of the second slant part; and the second inlet is formed between an end of the first slant part and the second side part.

2. The apparatus as set forth in claim 1, wherein the second slant part comprises:
   a first slant plate section comprising a plate extending perpendicularly from the end of the second side part toward the inside of the bottom part; and
   a second slant plate section extending slantedly from the first slant plate section toward the first side part.

3. The apparatus as set forth in claim 2, wherein an end of the second slant plate section is spaced apart from the first side part so that the first inlet is defined therebetween.

4. The apparatus as set forth in claim 1, wherein the first slant part comprises:
   a first slant plate section comprising a plate extending slantedly from the first side part toward the inside of the bottom part;
   a second slant plate section extending from an end of the first slant plate section in a direction parallel to the first side part; and
   a third slant plate section extending slantedly from the second slant plate section toward the second side edge of the bottom part.

5. The apparatus as set forth in claim 4, wherein an end of the third slant plate section is spaced apart from the second side part so that the second inlet, through which the electrolyte flows, is defined therebetween.

6. The apparatus as set forth in claim 1 being fixed in the casing by an outer surface of a pole plate assembly of the battery.

7. The apparatus as set forth in claim 1, wherein the first slant part and the second slant part extend toward the inside of the bottom part with a space defined therebetween so that a space on the upper surface of the bottom part is partitioned into at least two spaces;
   wherein the second slant part partitions the space on the upper surface of the bottom part into a first space formed at a first side of the second slant part so that the electrolyte is drawn into the first space, and a second space formed at a second side of the second slant part between the first slant part and the second slant part so that the electrolyte is contained in the second space; and
   the first slant part defines a third space along with the second side part at a side opposite to the second space, the third space communicating with the vertical passage.

8. A battery, comprising: a casing; a cover sealing an upper end of the case; terminal posts in the casing; electrolyte in the casing, the electrolyte having a first electrolyte and a second electrolyte having a lower specific gravity than the first electrolyte; and an apparatus for mixing the electrolyte, the apparatus comprising: a support comprising a plate protruding upward, the support being installed such that a space is defined between the support and an inner surface of a sidewall of a casing of the battery;
   a bottom part extending in one direction from and in contact with an upper end of the support to form a bottom surface; a first side part protruding upward from and in contact with a first side edge of an upper surface of the bottom part and extending along the first side edge of the bottom part; a second side part protruding upward from and in contact with a second side edge of the upper surface of the bottom part and extending to a front edge of the bottom part; and
   a first slant part comprising a plate extending slantedly from and in contact with the first side part toward an inside of the bottom part; and
   a second slant part comprising a plate extending slantedly from and in contact with the second side part toward the inside of the bottom part;
   wherein the first slant part and the second slant part extend in directions opposite to each other; wherein the support, the first side part, the second side part, the first slant part, and the second slant part are formed to define a first space, a second space, a third space, a first inlet and a second inlet; the first space is defined between the first side part and the second slant part; the second space is defined between the first slant part and the second slant part and the first and the second side parts; and the third space is defined between the support, the second side part, and the first slant part; the first inlet through which the electrolyte is drawn inside the bottom part is formed between the first side part and an end of the second slant part; and the second inlet is formed between an end of the first slant part and the second side part; wherein the support is installed to be spaced apart from the inner surface of the sidewall of the casing of the battery so that a vertical passage is defined by the support and the inner surface of the sidewall of the casing, wherein the electrolyte is moved along the vertical passage upward or downward depending on a direction of kinetic energy applied to the electrolyte.

9. The battery as set forth in claim 8, wherein the second slant part comprises:
   a first slant plate section comprising a plate extending perpendicularly from the end of the second side part toward the inside of the bottom part; and
   a second slant plate section extending slantedly from the first slant plate section toward the first side part.

10. The battery as set forth in claim 9, wherein an end of the second slant plate section is spaced apart from the first side part so that the first inlet is defined therebetween.

11. The battery as set forth in claim 8, wherein the first slant part comprises:
   a first slant plate section comprising a plate extending slantedly from the first side part toward the inside of the bottom part;
   a second slant plate section extending from an end of the first slant plate section in a direction parallel to the first side part; and
   a third slant plate section extending slantedly from the second slant plate section toward the second side edge of the bottom part.

12. The battery as set forth in claim 11, wherein an end of the third slant plate section is spaced apart from the second side part so that the second inlet, through which the electrolyte flows, is defined therebetween.

13. The battery as set forth in claim 8 being fixed in the casing by an outer surface of a pole plate assembly of the battery.

14. The battery as set forth in claim 8, wherein the first slant part and the second slant part extend toward the inside of the bottom part with a space defined therebetween so that a space on the upper surface of the bottom part is partitioned into at least two spaces;
   wherein the second slant part partitions the space on the upper surface of the bottom part into a first space formed at a first side of the second slant part so that the electrolyte is drawn into the first space, and a second space formed at a second side of the second slant part between the first slant part and the second slant part so that the electrolyte is contained in the second space; and the first slant part defines a third space along with the second side part at a side opposite to the second space, the third space communicating with the vertical passage.

* * * * *